E. J. WONSER.
WEEDER.
APPLICATION FILED JUNE 1, 1920.

1,397,847.

Patented Nov. 22, 1921.
2 SHEETS—SHEET 1.

Inventor
ELSWORTH J. WONSER
By E. E. Lange
Attorney.

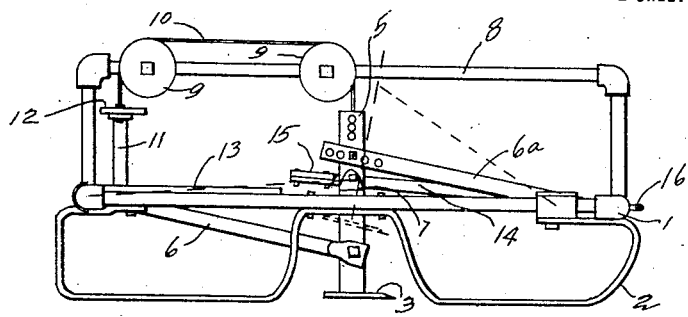
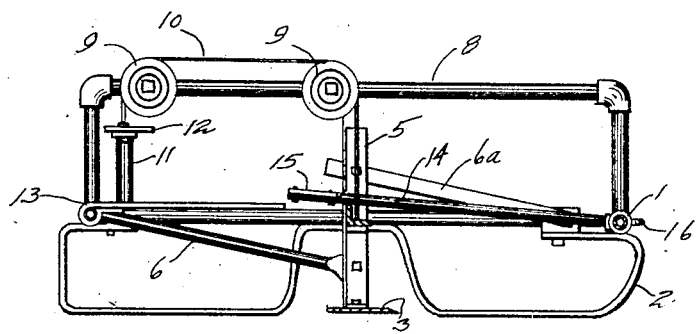
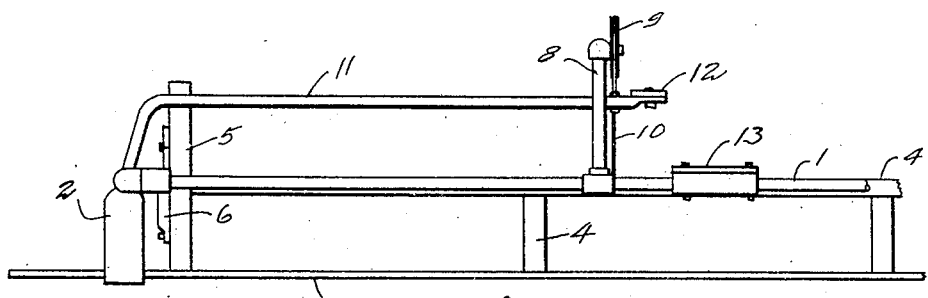
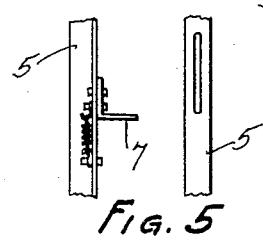

UNITED STATES PATENT OFFICE.

ELSWORTH J. WONSER, OF EUREKA, WASHINGTON.

WEEDER.

1,397,847.  Specification of Letters Patent.  Patented Nov. 22, 1921.

Application filed June 1, 1920. Serial No. 385,523.

*To all whom it may concern:*

Be it known that I, ELSWORTH J. WONSER, a citizen of the United States, residing at Eureka, in the county of Walla Walla and State of Washington, have invented certain new and useful Improvements in Weeders, of which the following is a specification.

This invention relates to that class of farm implements used for destroying weeds in fields and has for its object to provide a weeder whose frame is adapted to cutting members of various lengths without changing the size of the frame.

A further object is to provide a means for cleaning the cutting members without stopping the device and without dismounting therefrom.

A further object is to provide a means whereby the cutting means may be manually held in the ground against a pressure caused by the accumulation of weeds thereon.

With these and other objects in view reference is had to the accompanying drawings in which—

Figure 1:
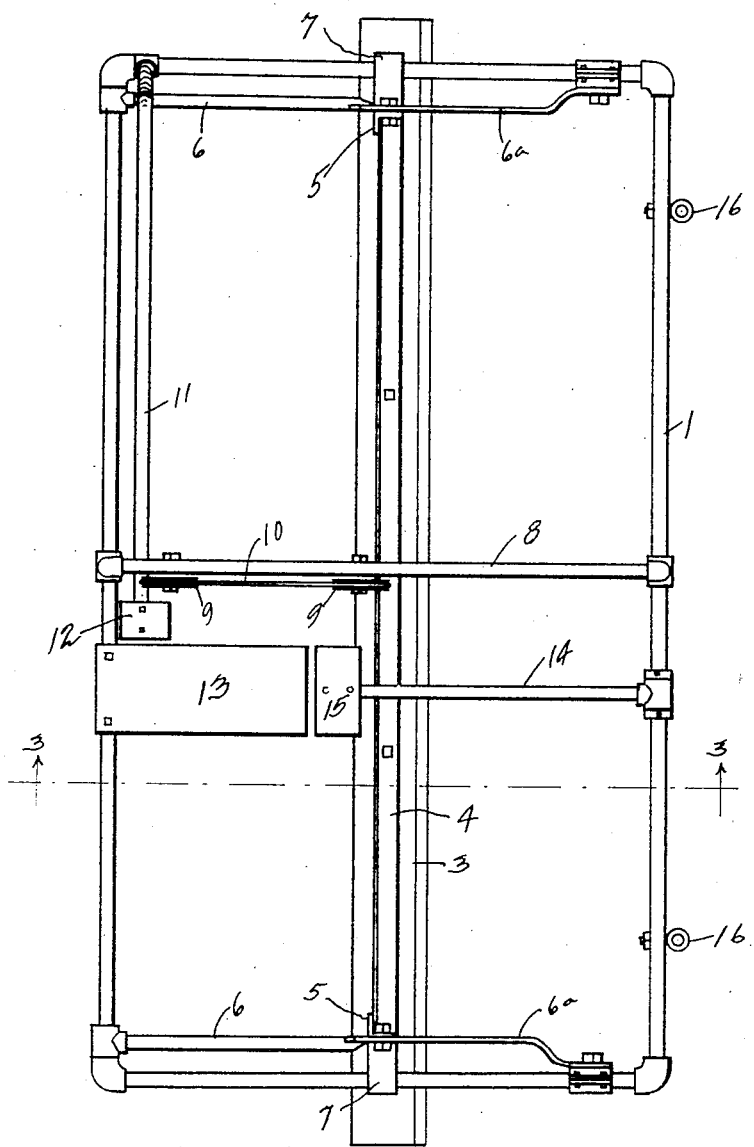
Figure 6:
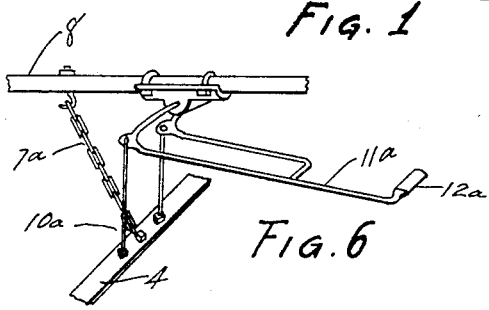

Figure 1 is a plan view of the weeder;
Fig. 2 is an end elevation thereof;
Fig. 3 is a sectional view on the line 3—3 of Fig. 1;
Fig. 4 is a partial rear elevation;
Fig. 5 is a fragmentary view of a stop; and
Fig. 6 shows a modified form of lifting mechanism.

In the drawings like numerals refer to like parts throughout and the numeral 1 refers to the frame which consists of any desired material but shown in this case as of pipe.

On each end of the frame is a runner 2 which is formed double to provide a space in which is positioned a cutting member 3 attached to and made a part of the cutting frame 4. The double runner 2 may be of flat metal as shown, but it is obvious that the runners may be of pipe similar to that of the frame if desired.

The cutting frame carries uprights 5 to which are pivotally attached hinge arms 6 and 6ª respectively, the forward arm 6ª being provided with bolt holes complemental to bolt holes in the uprights 5, as plainly shown in Fig. 2, for adjustment purposes. The hinge arm 6 is hinged to the rear portion of the frame 1 and is attached to the cutting frame low down so as to give a push directly against the cutting member 3. By this means the thrust comes below the center of support with a tendency to force the blade into the ground rather than draw it out.

On each upright and projecting over the frame 1 are stops 7 slidably attached thereto. These stops may be made yielding as shown in Fig. 5, if desired, although this is not deemed essential; the chain stop 7ª shown in Fig. 6 being considered most practical.

An elevated cross frame 8 braces the frame 1 and carries a lifting mechanism consisting of pulleys 9 over which is operably mounted a cable 10, one end of which is attached to the cutting frame 4 with its other end attached to a foot lever 11 hinged to the frame 1 and with the outer end of said foot lever provided with a foot pedal 12.

In the modified form as shown in Fig. 6 the lifting mechanism is attached to the cross frame 8 and consists of rods 10ª, instead of the cable 10, as a connecting medium between the foot lever 11ª and the cutting frame 4. The foot lever is hingeably attached to the cross frame in the manner shown and terminates in a pedal 12ª corresponding to the pedal 12 of the above described lifting mechanism.

A platform 13 is rigidly attached to the frame 1 and is conveniently located adjacent to the foot lever pedal 12.

A second foot lever 14 is also hinged to the frame 1 and also carries a pedal 15 on its free end, its free end resting on and movable with the cutting frame. This lever is also positioned with its pedal conveniently located adjacent to the platform 13.

Rings 16 or any suitable means may be employed for draft purposes.

In operation the driver stands upon the platform 13 and by forcing down the pedal 12 raises the cutting frame 4 until the cutting member 3 is free of the ground; the implement is now in a condition of inoperation and may be transported with little effort.

It must here be understood that the term "double runners" (2), as here applied, and also as used in the claims, are intended to include wheels when such wheels are spaced apart to provide room for the vertical operation of the cutting member 3.

It is obvious that a cutting member 3 of various lengths may be employed, as for instance an 8 foot frame may utilize a 6 foot cutting member, or a 14 foot member by projecting the member 3 feet on either end of the machine: thus one frame will answer for all lengths of cutting members without additional cost.

At the beginning of the work the pedal 12 is released and the cutting member enters the ground to a predetermined depth gaged by the position of the stop 7 on the uprights 5, (or 7ᵃ on the cross frame).

Now when heavy weeds are encountered the cutting member may become clogged with a tendency to raise out of the ground; to overcome this tendency the operator will stand on the pedal 15 forcing the cutting frame to remain in the ground against this tendency.

In cleaning the cutting member the operator places his foot on the pedal 12 (or 12ᵃ) and raises the cutting out of the ground, now by referring to Fig. 2 the dotted lines represent graphically the position of the cutting member, and hinges, the cutting member being shown as elevated and with its cutting edge depressed, therefore it will be noted that the accumulation of weeds on the cutting member will occur on the front or cutting edge of the cutting member, and by raising the member in this manner the weeds will fall from the cutting member leaving it clean for further operation.

As the cleaning operation is accomplished almost instantly it is unnecessary to stop the machine for this purpose.

If additional draft or suction of the cutting member is required it may be accomplished by throwing the top end of the uprights forward on the hinge arm 6ᵃ which may be carried out by means of the bolt holes above mentioned.

Thus I have provided a machine which is adaptable to all kinds of ground, and one that may be readily cleaned without dismounting therefrom.

Having thus described my invention, I claim

1. In a weeder, in combination with a frame and runners thereof, a cutting frame hingedly mounted within said frame and suspended from the front and rear portions thereof, and carrying a cutting member, a stop attached to said cutting frame, and a means for raising said cutting frame and with it said cutting member.

2. In a weeder, in combination with the frame and runners thereof, a cutting frame carrying a cutting member and adjustably and hingedly mounted within said frame, a cross frame disposed on said frame longitudinally of the line of travel, and a means for elevating said cutting frame attached to said cross frame.

3. In a weeder, in combination with a frame and runners thereof, an adjustable, vertically operable cutting frame, hingedly mounted within said frame by hinge arms, a cutting member attached to said cutting frame, the said hinge arms operating to depress the cutting edge of said cutting member as the cutting frame is raised, stops attached to said cutting frame, an elevated cross frame disposed above said frame and longitudinal to the line of travel, an operating lever attached to and disposed beneath said cross frame, a means for connecting said operating lever operably with said cutting frame and a second lever hingeably attached to said frame and with its free end resting on and movable with said cutting frame.

In testimony whereof I affix my signature.

ELSWORTH J. WONSER.